United States Patent
Lucas et al.

(10) Patent No.: US 10,724,343 B2
(45) Date of Patent: Jul. 28, 2020

(54) RIGUP RACEWAY FOR CONDUIT AT A SITE

(71) Applicant: Halliburton Energy Services, Inc., Houston, TX (US)

(72) Inventors: Bruce Carl Lucas, Marlow, OK (US); Timothy Holiman Hunter, Duncan, OK (US); Glenn Howard Weightman, Duncan, OK (US); David Wayne Murrell, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/336,302

(22) PCT Filed: Oct. 24, 2016

(86) PCT No.: PCT/US2016/058510
§ 371 (c)(1),
(2) Date: Mar. 25, 2019

(87) PCT Pub. No.: WO2018/080433
PCT Pub. Date: May 3, 2018

(65) Prior Publication Data
US 2019/0218890 A1 Jul. 18, 2019

(51) Int. Cl.
*F16C 33/60* (2006.01)
*E21B 41/00* (2006.01)
(Continued)

(52) U.S. Cl.
CPC .............. *E21B 41/00* (2013.01); *F16C 33/60* (2013.01); *F16C 29/0609* (2013.01); *H01R 4/00* (2013.01);
(Continued)

(58) Field of Classification Search
CPC . H01R 4/00; H02G 3/30; H02G 9/025; H02G 15/08; H02G 9/02; H02G 9/04; F16C 33/60
See application file for complete search history.

(56) References Cited

U.S. PATENT DOCUMENTS 3,692,921 A * 9/1972 Yonkers ................. H01R 11/00
174/72 R
3,965,967 A * 6/1976 Jentzsch ................. A62C 33/06
104/275
(Continued)

FOREIGN PATENT DOCUMENTS

CN 202293127 U 7/2012
CN 103223894 A 7/2013

OTHER PUBLICATIONS

U.S. Pat. No. 585,540 A issued Jun. 29, 1897 to J.H. Spangler, 3 pages.
(Continued)

*Primary Examiner* — Tho D Ta
(74) *Attorney, Agent, or Firm* — John W. Wustenberg; Baker Botts L.L.P.

(57) ABSTRACT

A raceway aligns conduit disposed in one or more raceway segments. The conduit provides a pathway for one or more resources to be delivered to certain equipment at a site. An access port of the raceway segment provides access to the resources distributed or conveyed by the conduit. The raceway segments are anchored to a surface to provide stability. The raceway may also include a ground grid to ground the raceway or other equipment. The conduit may convey any number of resources required at the site. The resources may include utilities, fluid, communications lines, control lines, or any other resource needed at the site. Any number of raceway segments may be coupled together to form a raceway for a site.

20 Claims, 4 Drawing Sheets

(51) Int. Cl.
  *H02G 15/08*  (2006.01)
  *H02G 3/30*  (2006.01)
  *H02G 9/02*  (2006.01)
  *H02G 9/04*  (2006.01)
  *H01R 4/00*  (2006.01)
  *F16C 29/06*  (2006.01)

(52) U.S. Cl.
  CPC ............... *H02G 3/30* (2013.01); *H02G 9/02* (2013.01); *H02G 9/025* (2013.01); *H02G 9/04* (2013.01); *H02G 15/08* (2013.01)

(56) References Cited

U.S. PATENT DOCUMENTS

| | | |
|---|---|---|
| D415,112 S | 10/1999 | Henry |
| 6,202,565 B1 * | 3/2001 | Henry ............... A62C 33/06 |
| | | 104/275 |
| 6,281,431 B1 * | 8/2001 | Cumley ............ G02B 6/4446 |
| | | 174/25 G |
| 7,309,836 B2 | 12/2007 | Lubanski |
| 7,595,450 B2 * | 9/2009 | Lubanski ............... H02G 9/025 |
| | | 104/275 |
| 8,276,322 B2 | 10/2012 | Miller |
| 8,342,211 B2 * | 1/2013 | King ...................... F16L 3/04 |
| | | 104/275 |
| 2002/0132506 A1 * | 9/2002 | Wilson .................. H01R 13/64 |
| | | 439/207 |
| 2003/0047941 A1 | 3/2003 | Thomas et al. |
| 2007/0137878 A1 * | 6/2007 | Henry .................... H02G 9/02 |
| | | 174/101 |
| 2015/0061380 A1 | 3/2015 | Schomacker |
| 2017/0129353 A1 * | 5/2017 | Bois ................... B60L 11/1825 |
| 2017/0264980 A1 * | 9/2017 | Greene ............. H04L 12/4625 |

OTHER PUBLICATIONS

International Search Report and Written Opinion issued in related PCT Application No. PCT/US2016/058510, dated Jul. 11, 2017, 11 pages.

* cited by examiner

RIGUP RACEWAY FOR CONDUIT AT A SITE

CROSS-REFERENCE TO RELATED APPLICATION

The present application is a U.S. National Stage Application of International Application No. PCT/US2016/058510 filed Oct. 24, 2016, which is incorporated herein by reference in its entirety for all purposes.

BACKGROUND

The present disclosure relates generally to providing rigup equipment and, more particularly, to a rigup raceway for a site.

In certain instances, conduit must be run at a site, for example, a well operations environment. The conduit may comprise cables or other lines for communication, control, power, utilities, fluid flow, or any other requirement of the particular operation at the site. Exposed conduit may create a safety hazard and may require intensive labor to move or adjust. In some instances, one conduit may cross another conduit increasing the risk of a short circuit, damage to the conduit, interference or any other undesirable condition. Exposed conduit may also create a safety risk for operators at the site as the conduit may comprise harmful power levels and create a slip, trip or fall hazard.

FIGURES

Some specific exemplary embodiments of the disclosure may be understood by referring, in part, to the following description and the accompanying drawings.

Figure 1:
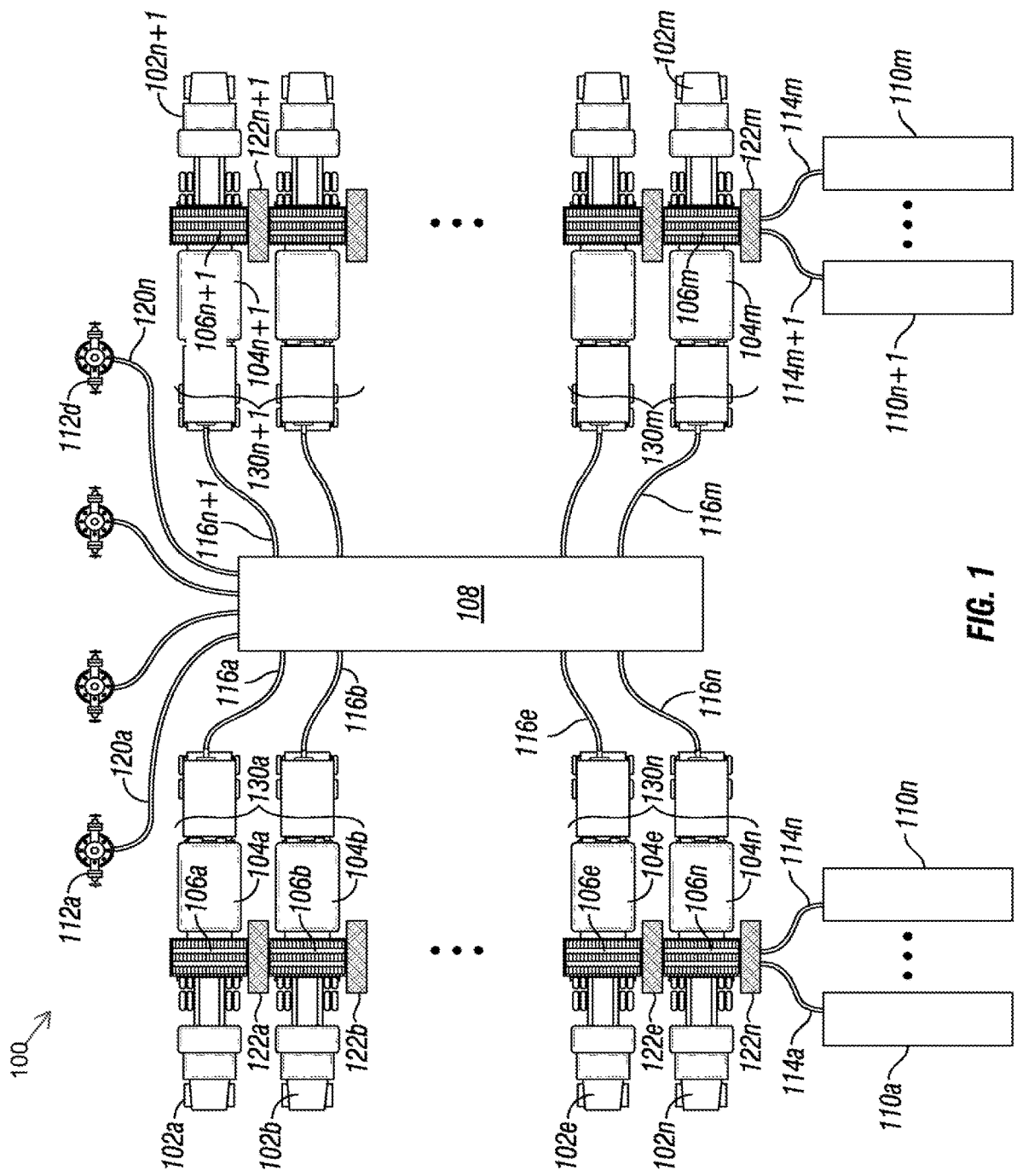
FIG. 1 is a diagram illustrating an example rigup raceway environment, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to rigup equipment and, more particularly, a rigup raceway for a site.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. For example, a widget "1a" refers to an instance of a widget class, which may be referred to collectively as widgets "1" and any one of which may be referred to generically as widget "1". In the figures and the description, like numerals are intended to represent like elements. A numeral followed by the alphabetical characters "n" or "m" refers to any number of widgets.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Many job sites or operations require that many types of conduit be set or positioned at the site. The conduit may comprise any number of cables, lines, pipes, fiber, hoses, conductors, wires, buses, fiberoptics, passage ways, pathways, empty space, tunneling, or any other conduit required for a given operation or equipment at the site. The conduit may comprise substantial weight, for example, five or more pounds per foot of conduit. The rigup (for example, placement and positioning) of the conduit may be time and labor intensive which increases costs for the given operation at the site. For some operations, the amount of conduit may create hazards and risks for the equipment, conduit, and operators at the site. For example, conduit in a pathway may create a slip and fall risk to operators, a risk of shock to operators, a potential for short-circuit of equipment coupled to the conduit, a risk of damage or wear to conduit due to exposure to environmental elements or from conduits crossing or touching each other, and any other hazards or risks associated with exposed conduit. The present disclosure provides for a rigup raceway to align and deploy conduit safely and efficiently at a site. For example, the present disclosure contemplates a rigup raceway that allows conduit at a site to cross, that provides a guide to align and space conduit, to enable deployment of a grounding grid, any other disposition of conduit, or any combination thereof.

FIG. 1 is a diagram illustrating an example of a rigup raceway environment 100. A site or rigup raceway environment 100 may require the distribution of conduit in a safe and efficient manner, for example, as illustrated in FIG. 1. While FIG. 1 illustrates the rigup raceway environment as a wellsite, the present disclosure contemplates the rigup raceway environment may be any environment that requires the distribution of conduit. A wellsite may comprise one or more wells 112, for example, wells 112a through 112n may be disposed about a wellsite. While rigup raceway environment 100 comprises one or more wells 112, one or more embodiments include a rigup raceway environment 100 that comprises any number of pieces of equipment. The one or more of the wells 112 may require servicing or that one or more other operations be performed at or in the wells 112. The one or more wells may couple to servicing equipment 108. In one or more embodiments, servicing equipment 108 comprises a manifold that, for example, pumps a fluid or material to one or more wells 112. While servicing equipment 108 is illustrated, the present disclosure contemplates any equipment 108 at a site that requires coupling to one or more components or devices for one or more resources. The one or more resources may comprise, any one or more of utilities (for example, power or gas), fluid (for example, water, lubricant, slurry, mud, or any other fluid), communication lines, power bus or any other type of bus, control lines, air, or any other resource.

To accommodate the resource requirements, rigup raceway environment 100 comprises a raceway 106. As illustrated, servicing equipment 108 may be positioned between raceways 106a and 106n. While FIG. 1 illustrates raceways 106a and 106n disposed essentially parallel from each other, the present disclosure contemplates any arrangement of any number of raceways 106 according to the specific requirements of a given operation. Raceways 106 may comprise any number of raceway segments 130. For example, raceway 130a comprises raceway segments 106a through 106b and raceway 130n comprises raceway segments 106e through 106m. In one or more embodiments, raceway segments 130 may be transported to a site on a trailer of a transport vehicle (such as a tractor trailer, a train, a ship or any other transport vehicle), a skid or sled assembly or any other transportation device. Raceway segments 130 may be positioned by lifting each segment via a crane, forklift, trailer, skid, sled assembly or any other pulling, dragging or lifting device or mechanism. The raceway segments 130 may be fabricated or adapted with wheels to act as transport trailer(s) as well.

Raceway segments 130 may comprise one or more access ports 122 to provide access to conduit running through the raceway segments 130. For example raceway segment 130a may comprise one or more access port 122a, raceway segment 130n may comprise one or more access ports 122n, raceway segment 130n+1 may comprise one or more access ports 122n+1, and raceway segment 130m may comprise one or more access ports 122m. Access ports 122 may be disposed at one end of the raceway segment 130 or may be disposed at both ends, at any location along the raceway segment 130 or any combination thereof. For example, access ports 122 may be disposed at both ends of a raceway segment 130, at one end and in a middle (as illustrated), or at any location or combination thereof. In one or more embodiments, servicing equipment 108 may couple directly to one or more raceway segments 130 via one or more access ports 122. As vehicles (such as a truck) or other devices may need to travel across the raceway segment 130, access ports 122 may be disposed at predetermined positions so that such vehicles and equipment do not traverse the section of the access ports 122. For example, as illustrated in FIG. 1, access ports 122 may be disposed at least a distance apart such that a vehicle 102 may traverse the raceway segment 130 without crossing over the access ports 122. In one or more embodiments, access ports 122 may be preconfigured as part of the raceway segment 130 or may be configured or adapted to couple to the raceway segment 130 after installation of the raceway segment 130.

Once the raceways 106 are positioned, one or more operation devices or equipment 104 may be positioned at the rigup raceway environment 100. In one or more embodiments, operation device 104 comprises a pump (for example a hydraulic pump) or any other type of well servicing equipment. For example, one or more operation devices 104 may be disposed on a trailer and transported to the rigup raceway environment 100 via a vehicle 102. For example, operation devices 104a through 104n may be transported via vehicles 102a through 102n, respectively, and operation devices 104n+1 through 104m may be transported via vehicles 102n+1 through 102m, respectively. The vehicle 102 may traverse the raceway segment 130 to position the operation devices 104 at an appropriate proximity to an access port 122. Operation device 104 may couple to servicing equipment 108 via one or more service lines 116. For example, operation device 104a may couple to servicing equipment 108 via one or more service lines 116a, operation device 104n may couple to servicing equipment 108 via one or more service lines 116n, operation device 104n+1 may couple to servicing equipment 108 via one or more service lines 116n+1 and operation device 104m may couple to servicing equipment 108 via one or more service lines 116m. Servicing equipment 108 may be coupled to any other site device or other servicing equipment 108 via one or more distribution lines 120. For example, servicing equipment 108 may be coupled to one or more wells 112a through 112n via one or more distribution lines 120a through 120n.

Any one or more raceway segments 130 may receive one or more resources from a resource unit 110. Resource unit 110 may couple to one or more conduits (not shown) of a raceway segment 130 via one or more resource lines 114. For example, one or more resource units 110a and 110 may couple to raceway 106a via one or more resource lines 114a and 114n, respectively, and one or more resource units 110n+1 through 110m may couple to raceway 106n via one or more resource lines 114n+1 to 114m. Resource unit 110 may comprise a generator (for example, a turbine, diesel engine, or steam powered generator), a fluid pump, a utility source (gas, power, or other utility), communications unit, control unit, chemical blender, storage or distribution unit, proppant storage or distribution unit, or any other process equipment. The resource unit 110 may convey the resource to the raceway 106 via the conduit.

In one or more embodiments, rigup raceway environment 100 is a well site with wells 112a through 112n. Servicing equipment 108 may comprise a manifold that receives stimulation fluid, for example, frac fluid, water, slurry, or any other well stimulation fluid, pumped via a service line 116. In one or more embodiments, operation device 104 comprises a pump to pump the stimulation fluid. The pump may receive power from an access port 122 of a raceway segment 130 of a raceway 106. The raceway segment 130 may receive power from resource unit 110 which may comprise a generator. The manifold (servicing equipment 108) may inject the stimulation fluid to a well 112.

The raceway 106 provides alignment of any required conduit for the conveyance of any necessary resources to the rigup raceway environment 100 such that the resources and conduit are not distributed across the rigup raceway environment 100 in a potentially unsafe or damaging manner. The raceway 106 also provides easy adjustment or repositioning of the required resources and conduit. For example, if after installation of raceway 106a and operation devices 104a through 104n, servicing equipment 108 requires that the operation devices be repositioned, the operation device 104a may easily be moved without disruption of operation of any raceways 106 or operation devices 104b through 104n+1.

Figure 2:
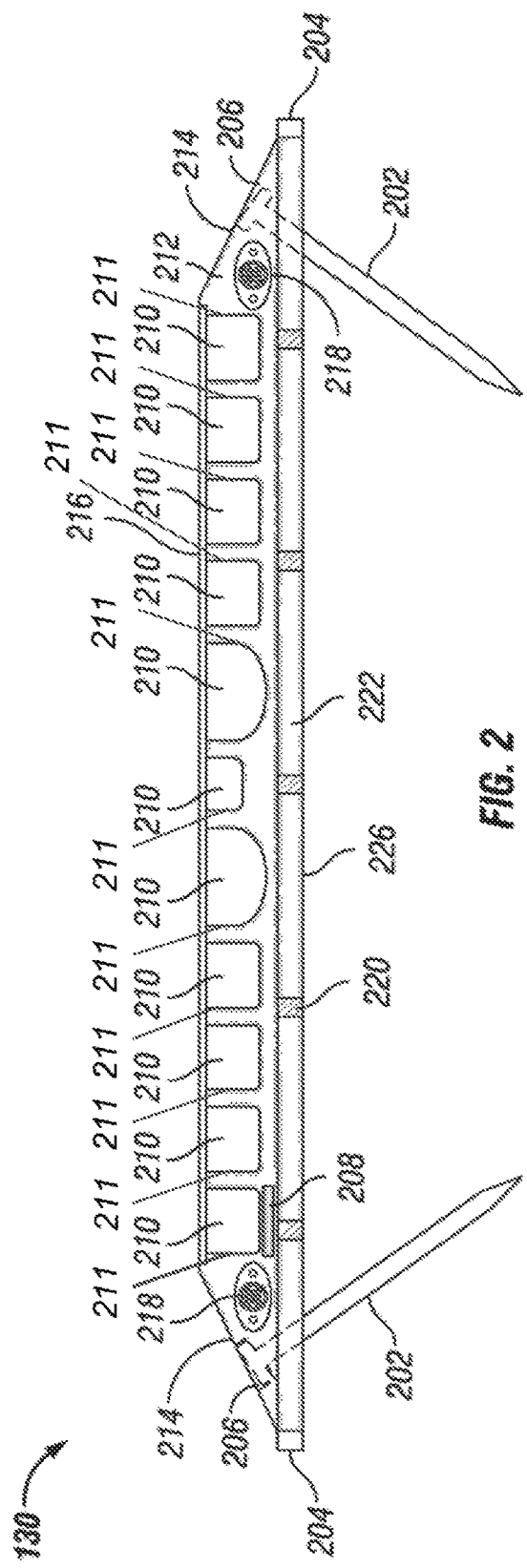
FIG. 2 is a diagram illustrating a front view of an example raceway segment, according to one or more aspects of the present disclosure.

FIG. 2 is a diagram illustrating a front view of an example raceway segment 130, according to one or more aspects of the present disclosure. A raceway segment 130 may comprise any one or more components as illustrated in FIG. 2. Raceway segment 130 may comprise any composite or metal material suitable for a given rigup raceway environment 100. For example, in one or more embodiments, raceway segment 130 may comprise a rubber, sheet metal, or plastic material. Raceway segment 130 may comprise an anchor 202 positioned within an anchor pocket 206 to secure the raceway segment at the rigup raceway environment 100. Anchor 202 may comprise any type of anchor including, but not limited to, a spike, rebar, bolt, talon, claw, spade, screw or any other type of suitable anchor. Anchor pocket 206 may comprise a recess, groove, inset, or any other suitable deviation in a side surface 214 of raceway segment 130 such that anchor 202 does not protrude from or is flush to an outer surface of the side surface 214. In one or more embodiments anchor pocket 206 is not necessary. For example, in one or more embodiments, anchor 202 comprises an anchor with a rounded or smooth top surface.

Raceway segment 130 may comprise a ground grid 204. The ground grid 204 may comprise a conductive grid that contacts the earth via a bottom surface 226 to distribute earth potential. While the ground grid 204 is illustrated as a grid, the present disclosure contemplates that ground grid 204 may be constructed in any manner such that an adequate ground is provided to the raceway segment 130. Ground grid 204 may comprise a metal grid where the metal grid may be a welded or cast structure. For example, ground grid 204 may comprise metal strips 220 that are disposed adjacent to empty space 222 that run a length of the raceway segment 130. Metal strips 220 may comprise any suitable material for grounding ground grid 204. The metal strips 220 may be disposed such that the metal strips 220 contact the surface of the earth. Empty space 222 may comprise air or any other material including, but not limited to, interior surface 212. Ground grid 204 may be coupled to one or more other sources to provide an adequate ground to the raceway segment 130. Bottom surface 226 of ground grid 204 may comprise a rigid material such that raceway segment 130 does not recess into soft earth and any weight of vehicles or equipment traversing the raceway segment 130 is distributed to prevent damage to any one or more conduits 210. In one or more embodiments anchor 202 couples to the ground grid 204 to provide further grounding of the ground grid 204. The ground grid 204 may provide ground for the raceway 106 and any one or more devices or equipment coupled to one or more conduits 210 or in contact with raceway 106.

Raceway segment 130 may comprise one or more conduits 210. In one or more embodiments, any of the one or more conduits 210 of the raceway segment 130 may be pre-populated with any one or more conduits 210 or populated with any one or more conduits 210 at the site (for example, rigup raceway environment 100 of FIG. 1). The one or more conduits 210 may comprise any dimension suitable for the type of resource to be conveyed or transported by the conduit 210. Conduits 210 may be recessed below a top surface 216 of raceway segment 130 to prevent damage to the conduits 210. The recesses 211 may include, but are not limited to, a groove, insert, slit, or any other suitable recess. In one or more embodiments, conduits 210 may be exposed such that a top surface 216 of the raceway segment 130 does not cover one or more top surface portions of the conduits 210. In one or more embodiments, conduits 210 may be partially or completely covered by a top surface 216 of the raceway segment 130. Conduits 210 may be separated from each other and ground grid 204 by an interior surface 212 of the raceway segment 130.

One or more raceway connectors 218 may be disposed about or within the raceway segment 130. Raceway connectors 218 provide coupling between one or more raceway segments 130. Raceway connectors 218 may be any type of connector to secure any two raceway segments 130 together. For example, raceway connectors 218 couple two raceway segments 130 together such that continuity of conduits 210 is seamless and unobstructed, uninterrupted or otherwise continuous. A raceway connector 218 may be positioned at or near either or both side surfaces 214 of a raceway segment 130. While raceway connector 218 is illustrated as positioned at or near side surface 214, the present disclosure contemplates that any one or more raceway connectors 218 may be positioned at any suitable location within or about the raceway segment 130. In one or more embodiments, raceway connectors 218 are disposed within the raceway segment 130 (as illustrated) such that raceway connectors 218 are not exposed. In one or more embodiments, raceway connectors 218 comprise one or more clips, latches or other securing device at a top surface of one or more side surfaces 214.

Figure 3:
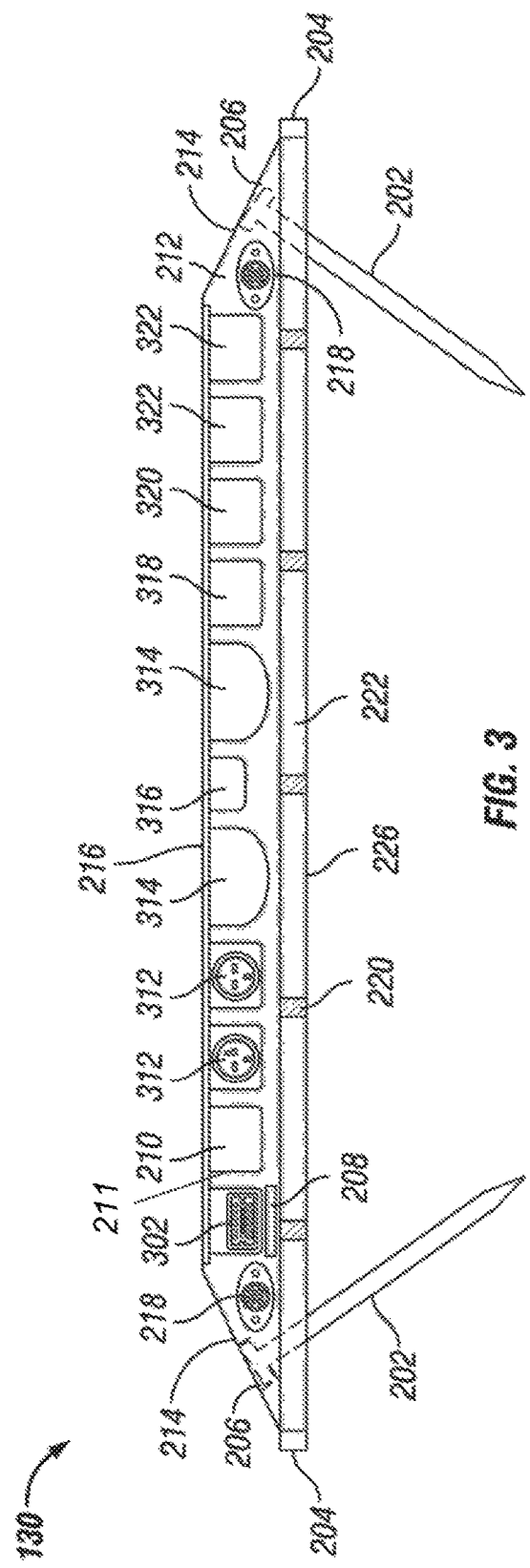
FIG. 3 is a diagram illustrating a front view of an example raceway segment, according to one or more aspects of the present disclosure.

FIG. 3 illustrates an example front view of a raceway segment 130, according to one or more aspects of the present invention. Raceway segment 130 of FIG. 3 may comprise any one or more components as discussed with respect to FIG. 2. One or more conduits 210 may comprise any one or more of one or more control cables 302, one or more power cables 312, one or more empty pathways 314, one or more busses 316, one or more utilities or fuel 318, one or more fluid lines 320, one or more communications lines 322, one or more other resource lines, or any combination thereof. Empty pathways 314 may provide for drainage of fluids at a surface of rigup raceway environment 100, comprise air or any other fluid (for example, water) or any other suitable material.

In one or more embodiments, the one or more resources provided by conduits 210 may be pre-determined such that the appropriate pipes, tubes, cables, busway conductors, empty spaces, lines, or other necessary components are disposed within raceway segment 130 prior to transportation of raceway segment 130 to a rigup raceway environment 100. In one or more embodiments, conduits 210 may be altered or adjusted at a rigup raceway environment 130. In one or more embodiments, conduits 210 may run an entire length of a raceway 106. In one or more embodiments, conduits 210 may terminate at any one or more raceway segments 130. In one or more embodiments, any one or more conduits 210 comprise an indicator 208 that identifies or otherwise provides an indication as to the type of conduit 210 or resource transported via conduit 210.

Figure 4:
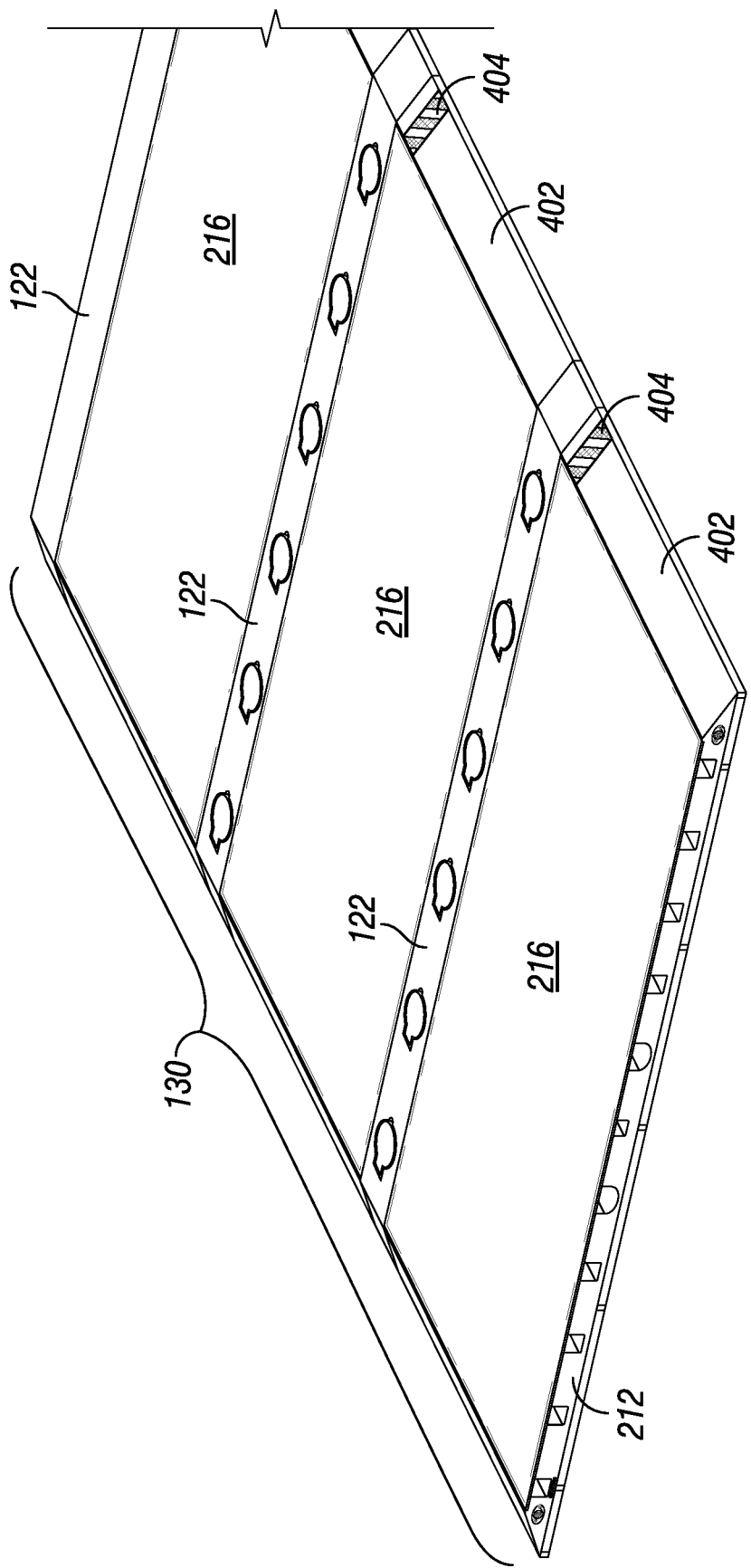
FIG. 4 is a diagram illustrating a perspective view of an example raceway segment, according to one or more aspects of the present disclosure.

FIG. 4 illustrates a perspective view of a raceway segment 130, according to one or more aspects of the present disclosure. Raceway segment 130 may comprise one or more guides 404 disposed about a lengthwise side of raceway segment 130. Guide 404 may comprise a rounded or beveled protrusion, a mound, a curb, a label (for example, a reflective label), a sensor (for example, a motion sensor that provides beeps or alarms), any suitable alignment device, or any combination thereof. Guide 404 may provide guidance for positioning at or traversing across a raceway 130 an operation device 104, a vehicle 102, any other equipment at rigup raceway environment 100, or any combination thereof. Guide 404 may be disposed adjacent to or in proximity to an access port 122 to avert traversal of the access port 122. In one or more embodiments, one or more guides 404 may be disposed at, near or in proximity to each access port 122 disposed about the raceway segment 130. In one or more embodiments, guides 404 may be disposed at each end, middle, or any position in between of a raceway segment 130.

In one or more embodiments, raceway segment 130 may be of any dimension. In one or more embodiments, raceway segment 130 may comprise a dimension that permits transportation as a trailer assembly or via a standard or oversized trailer of a tractor trailer, a railcar bed, or any other pallet suitable for transport to a rigup raceway environment 100.

Figure 5:
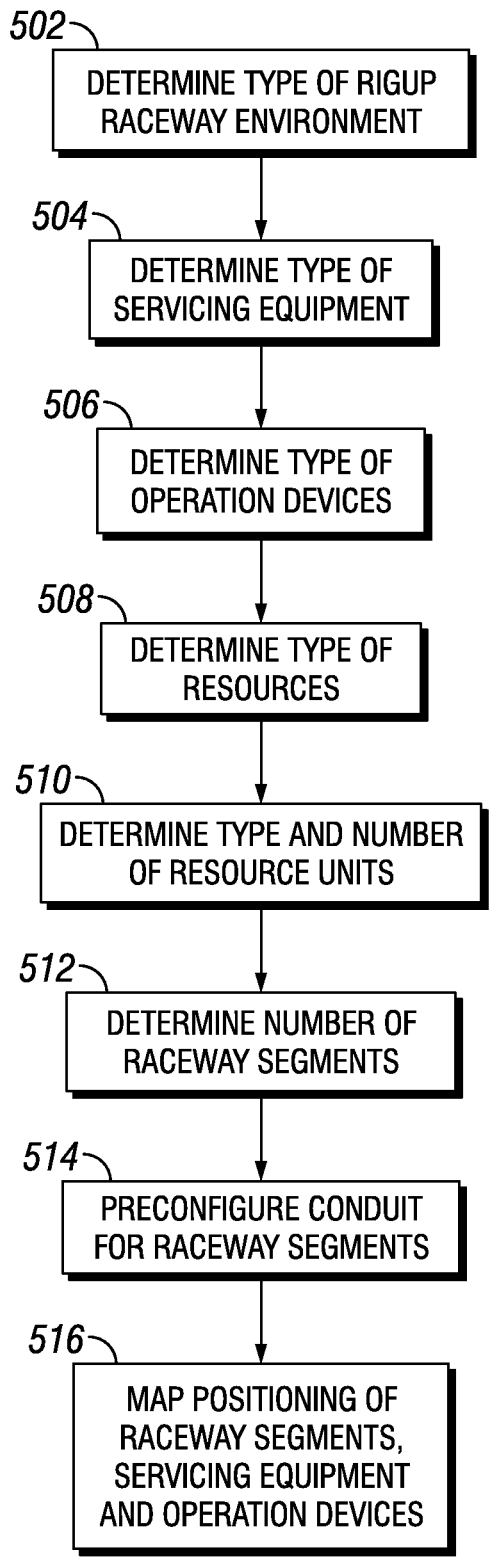
FIG. 5 is a flowchart illustrating an example method according to one or more aspects of the present disclosure.

FIG. 5 illustrates a method according to one or more aspects of the present invention. At step 502, the type of rigup raceway environment 100 is determined, for example, a well site (as illustrated in FIG. 1). At step 504, the type of servicing equipment 108 is determined based, at least in part, on the type of rigup raceway environment 100. At step 506, the type and number of operation devices 104 is determined based, at least in part, on any one or more of the determined type of servicing equipment 108 and the rigup raceway environment 100. At step 510, the type and number of resource units 110 are determined based, at least in part, on any one or more determinations made at steps 502 through 508. At step 512, the number or quantity of raceway segments 130 required for a given rigup raceway environment (for example, rigup raceway environment 100 of FIG. 1) may be determined based, at least in part, on any one or more of steps 502 through 508, the amount of space available at the rigup raceway environment 100, the amount of inventory of raceway segments 130 or any other factor for a given operation. At step 514, the one or more conduits 210 for the raceway segments 130 are determined based, at least in part, on any one or more of steps 502 through 512. At step 516, a map is generated or created that indicates the positioning of any one or more any of the determinations of steps 502 through 514. The map may be created or generated manually or by an information handling system (for example, a computing device). In one or more embodiments, any one or more steps of FIG. 5 may not be implemented or may be implemented in any order.

Figure 6:
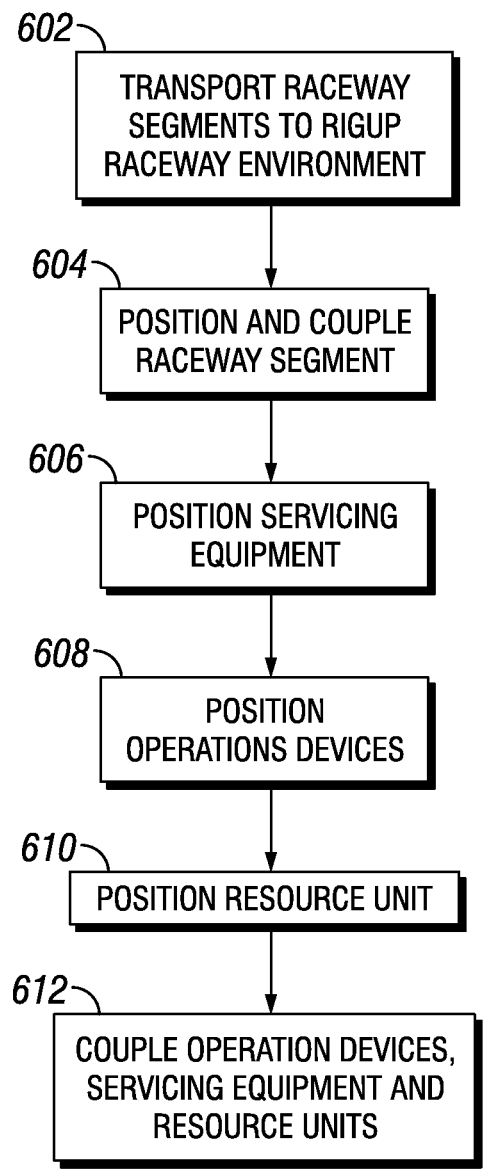
FIG. 6 is a flowchart illustrating an example method according to one or more aspects of the present disclosure.

FIG. 6 illustrates a method according to one or more aspects of the present invention. At step 602, the configured raceway segments 130 may be transported via any suitable vehicle or device to the rigup raceway environment 100. At step 604, the raceway segments 130 are positioned at the rigup raceway environment 100. The positioning at step 604 may be based, at least in part, on the created or generated map at step 516 of FIG. 5. At step 606 any one or more servicing equipment 108 may be positioned at the rigup raceway environment 100. At step 608, any one or more operation devices 104 are positioned at the rigup raceway environment 100. At step 610, one or more resource units are positioned at the rigup raceway environment 100. At step 612, the one or more resource units 110, operation devices 104 and servicing equipment are coupled either to each other to any one or more of the raceway segments 130.

In one or more embodiments, a system for distribution of conduit at a site comprises an operation device disposed about the site, a raceway segment disposed about the site, wherein the raceway segment comprises a connector, wherein the connector couples the raceway to the operation device and one or more conduits disposed within a recess of the raceway, wherein the one or more conduits traverse a length of the raceway, and wherein at least one of the one or more conduits transport one or more resources, and one or more resource lines coupled to one or more conduits, wherein at least one of the one or more resource lines transports a resource from a resource unit. In one or more embodiments, the raceway segment further comprises a ground grid disposed at a bottom portion of the raceway segment. In one or more embodiments, the ground grid comprises at least one metal strip and at least one empty space disposed a length of the ground grid. In one or more embodiments, the raceway segment further comprises an anchor, wherein the anchor secures the raceway segment to a surface of the site. In one or more embodiments, the raceway segment further comprises at least one beveled side surface. In one or more embodiments, the recess is covered by a top surface of the raceway segment. In one or more embodiments, the raceway segment further comprises a guide, wherein alignment of the operation device is based, at least in part, on the guide. In one or more embodiments, the raceway segment further comprises one or more raceway connectors, wherein the one or more raceway connectors couple one or more raceway segments together. In one or more embodiments, the at least one of the one or more conduits comprise a utility line, a communications line, a control line, or a fluid line.

In one or more embodiments, a system for distribution of conduit at a site comprises a servicing equipment disposed about the well site, a raceway segment disposed about the well site, wherein the race way comprises one or more conduits disposed within a recess of the raceway segment, an operation device disposed about the raceway segment, wherein the operation device couples to at least one of the one or more conduits of the raceway segment and the servicing equipment and a resource unit disposed about the well site, wherein the resource unit couples to one or more of the one or more conduits of the raceway. In one or more embodiments, the operation device comprises a pump, the servicing equipment comprises a manifold, and the resource unit comprises a generator, and wherein the pump pumps a stimulation fluid.

In one or more embodiments, a method for distributing conduit at a site comprises disposing an operation device about the site, disposing a raceway segment about the site, coupling the raceway segment to the operation device via a connector of the raceway, transporting one or more resources to the operation device via one or more conduits recessed within the raceway and coupling one or more resources lines from a resource unit to at least one of the one or more conduits. In one or more embodiments, the method further comprises grounding the raceway segment via a ground grid disposed at a bottom portion of the raceway segment. In one or more embodiments, grounding the raceway segment comprises disposing the raceway on a surface of the earth such that one or more metal strips disposed within the ground grid contact earth. In one or more embodiments, the method further comprises securing the raceway segment to a surface via an anchor. In one or more embodiments, disposing the operation about the site comprises traversing the raceway segment with a vehicle to position the operation device. In one or more embodiments, traversing the raceway segment is based, at least in part, on one or more guides of the raceway segment. In one or more embodiments, the method further comprises coupling another raceway segment to the raceway segment via one or more raceway connectors. In one or more embodiments, the method further comprises receiving power at the at least one of the one or more conduits from the resource unit. In one or more embodiments, the method further comprises receiving power at the operation device from the at least one of the one or more conduits, pumping a stimulation fluid from the operation device to servicing equipment, and injecting the stimulation fluid from the servicing equipment to at least one well at the site.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure.

What is claimed is:

1. A system for distribution of conduit at a site, comprising:
    an operation device disposed about the site;
    a servicing equipment disposed about the site;
    a raceway segment disposed about the site, wherein the raceway segment comprises:
    a connector, wherein the connector couples the raceway to the operation device; and
    one or more conduits disposed within a recess of the raceway segment, wherein the one or more conduits traverse a length of the raceway segment, and wherein at least one of the one or more conduits transport one or more resources from one or more resource units, wherein the operation device couples to at least one of the one or more conduits of the raceway segment and the servicing equipment;
    one or more resource lines coupled to one or more conduits, wherein at least one of the one or more resource lines transports a resource of the one or more resources from a resource unit.

2. The system for distribution of conduit at a site of claim 1, wherein the raceway segment further comprises a ground grid disposed at a bottom portion of the raceway segment.

3. The system for distribution of conduit at a site of claim 2, wherein the ground grid comprises at least one metal strip and at least one empty space disposed a length of the ground grid.

4. The system for distribution of conduit at a site of claim 1, wherein the raceway segment further comprises an anchor, wherein the anchor secures the raceway segment to a surface of the site.

5. The system for distribution of conduit at a site of claim 1, wherein the raceway segment further comprises at least one beveled side surface.

6. The system for distribution of conduit at a site of claim 1, wherein the recess is covered by a top surface of the raceway segment.

7. The system for distribution of conduit at a site of claim 1, wherein the raceway segment further comprises a guide, wherein alignment of the operation device is based, at least in part, on the guide.

8. The system for distribution of conduit at a site of claim 1, wherein the raceway segment further comprises one or more raceway connectors, wherein the one or more raceway connectors couple a plurality of raceway segments together.

9. The system for distribution of conduit at a site of claim 1, wherein the at least one of the one or more conduits comprise a utility line, a communications line, a control line, or a fluid line.

10. A system for distribution of conduit at a well site, comprising:
    a servicing equipment disposed about the well site;
    a raceway segment disposed about the well site, wherein the race way comprises one or more conduits disposed within a recess of the raceway segment;
    an operation device disposed about the raceway segment, wherein the operation device couples to at least one of the one or more conduits of the raceway segment and the servicing equipment; and
    a resource unit disposed about the well site, wherein the resource unit couples to one or more of the one or more conduits of the raceway segment.

11. The system for distribution of conduit at a well site of claim 10, wherein the operation device comprises a pump, the servicing equipment comprises a manifold, and the resource unit comprises a generator, and wherein the pump pumps a stimulation fluid.

12. A method for distributing conduit at a site, comprising:
    disposing an operation device about the site;
    disposing a servicing equipment about the site;
    disposing a raceway segment about the site;
    coupling the raceway segment to the operation device via a connector of the raceway;
    transporting one or more resources from a resource unit to the operation device via one or more conduits recessed within the raceway segment, wherein the operation device couples to at least one of the one or more conduits of the raceway segment and the servicing equipment; and
    coupling one or more resources lines from the resource unit to at least one of the one or more conduits.

13. The method for distributing conduit at a site of claim 12, further comprising grounding the raceway segment via a ground grid disposed at a bottom portion of the raceway segment.

14. The method for distributing conduit at a site of claim 13, wherein grounding the raceway segment comprises disposing the raceway segment on a surface of the earth such that one or more metal strips disposed within the ground grid contact earth.

15. The method for distributing conduit at a site of claim 1, further comprising securing the raceway segment to a surface via an anchor.

16. The method for distributing conduit at a site of claim 1, wherein disposing the operation about the site comprises traversing the raceway segment with a vehicle to position the operation device.

17. The method for distributing conduit at a site of claim 16, wherein traversing the raceway segment is based, at least in part, on one or more guides of the raceway segment.

18. The method for distributing conduit at a site of claim 12, further comprising:
    coupling another raceway segment to the raceway segment via one or more raceway connectors.

19. The method for distributing conduit at a site of claim 12, further comprising receiving power at the at least one of the one or more conduits from the resource unit.

20. The method for distributing conduit at a site of claim 19, further comprising:
   receiving power at the operation device from the at least one of the one or more conduits;
   pumping a stimulation fluid from the operation device to servicing equipment; and
   injecting the stimulation fluid from the servicing equipment to at least one well at the site.

* * * * *